(12) United States Patent
Chen

(10) Patent No.: US 7,471,476 B2
(45) Date of Patent: Dec. 30, 2008

(54) IMPACT-RESISTANT BARREL ASSEMBLY FOR A LENS DEVICE

(75) Inventor: Tsung-Li Chen, Changhua (TW)

(73) Assignee: Asia Optical Co., Inc., Taichung (TW)

( * ) Notice: Subject to any disclaimer, the term of this patent is extended or adjusted under 35 U.S.C. 154(b) by 6 days.

(21) Appl. No.: 11/879,093

(22) Filed: Jul. 16, 2007

(65) Prior Publication Data

US 2008/0019028 A1   Jan. 24, 2008

(30) Foreign Application Priority Data

Jul. 18, 2006  (TW) ............................ 95126199 A

(51) Int. Cl.
*G02B 7/02* (2006.01)

(52) U.S. Cl. ...................................... 359/826; 359/701
(58) Field of Classification Search ......... 359/694–703, 359/820–822, 826
See application file for complete search history.

(56) References Cited

U.S. PATENT DOCUMENTS 4,729,644 A * 3/1988 Ueyama ..................... 359/701

* cited by examiner

*Primary Examiner*—Hung X Dang
*Assistant Examiner*—Vipin M Patel
(74) *Attorney, Agent, or Firm*—Trop, Pruner & Hu, P.C.

(57) ABSTRACT

A barrel assembly for a lens device includes a stationary barrel, first and second barrel components, and a coupling pin. The stationary barrel surrounds an axis and has a first surface, and a second surface opposite to the first surface, and a guide slot formed through the first and second surfaces. The first barrel component engages sleevingly the stationary barrel and has a third surface. The second barrel component engages sleevingly the stationary barrel, and has a fourth surface that faces the second surface, and a cam slot that is formed in the fourth surface, and that is cooperatively defined by first and second slide surfaces, and first and second abutting portions. The coupling pin extends radially from the first barrel component through the guide slot in the stationary barrel to the second barrel component, and has a retaining section slidable along the first and second slide surfaces, and a reinforcing section extending between the first and second abutting portions.

15 Claims, 9 Drawing Sheets

IMPACT-RESISTANT BARREL ASSEMBLY FOR A LENS DEVICE

CROSS-REFERENCE TO RELATED APPLICATION

This application claims priority of Taiwanese Application No. 095126199, filed on Jul. 18, 2006.

BACKGROUND OF THE INVENTION

1. Field of the Invention

The invention relates to an impact-resistant optical component, more particularly to a barrel assembly for a lens device that can resist an impact.

2. Description of the Related Art

As shown in FIG. 1, a conventional lens device includes a stationary barrel 11 surrounding an axis (L), a lens module 12 sleeved inside the stationary barrel 11 and having a set of lenses (not shown) and an outer surrounding surface 121, an outer lens barrel 13 sleeved outside the stationary barrel 11 and having an inner wall surface 131, and three angularly spaced apart coupling pins 14 (only two are shown).

The stationary barrel 11 has three angularly spaced apart guide slots 111 (only two are shown), each of which is parallel to the axis (L). The outer lens barrel 13 has three angularly spaced apart cam slots 132 (only two are shown) formed in the inner wall surface 131, each of which extends circumferentially. Each of the coupling pins 14 is connected to the outer surrounding surface 121 of the lens module 12, extends radially and outwardly toward the outer lens barrel 13, and has a connecting section 141 connected to the lens module 12, a guide section 142 extending from the connecting section 141 and through a respective one of the guide slots 111 so as to be guided thereby, and a retaining section 143 extending from the guide section 142 and retained slidably in a respective one of the cam slots 132.

When the outer lens barrel 13 rotates relative to the stationary barrel 11, it drives the coupling pins 14 to slide respectively along the cam slots 132. The coupling pins 14 are also guided respectively by the guide slots 111 in the stationary barrel 11 to move in directions parallel to the axis (L). Since the connecting section 141 of each of the coupling pins 14 is connected to the lens module 12, the lens module 12 will move together with the coupling pins 14, thereby resulting in zoom adjustment.

However, when an impact force (F) is applied to the lens module 12 (see FIG. 2), the retaining section 143 of a respective one of the coupling pins 14 may be forced to slide out of the respective one of the cam slots 132, resulting in the lens module 12 and the coupling pins 14 being stuck in the outer lens barrel 13.

As shown in FIGS. 3 and 4, another conventional lens device has a structure similar to that shown in FIG. 1. Unlike the lens device of FIG. 1, the lens device of FIG. 3 further includes three angularly spaced apart reinforcing pins 15 (only two are shown) and three reinforcing slots 133 formed in the inner wall surface 131 of the outer lens barrel 13 and extending parallel to the cam slots 132 in the inner wall surface 131, respectively. Each of the reinforcing pins 15 is connected to the outer surrounding surface 121 of the lens module 12, extends radially and outwardly toward the outer lens barrel 13, and has a connecting part 151 connected to the lens module 12, a guide part 152 extending from the connecting part 151 and through a respective one of the guide slots 111 so as to be guided thereby, and a retaining part 153 extending from the guide part 152 and retained slidably in a respective one of the reinforcing slots 153. The coupling pins 14 cooperate with the reinforcing pins 15 to bear the impact force (F), thereby distributing the impact force (F) and preventing the pins 14, 15 from sliding out of the slots 132, 133.

However, the requirement of forming the additional reinforcing slots 133 increases the lengths of the outer lens barrel 13 and the stationary barrel 11, thereby leading to a relatively thick lens device. Moreover, the disposition of the reinforcing pins 15 results in a higher manufacturing cost.

SUMMARY OF THE INVENTION

Therefore, the object of the present invention is to provide a barrel assembly for a lens device that can resist an impact without increasing either the manufacturing cost or the length thereof.

Accordingly, a barrel assembly for a lens device of the present invention comprises a stationary barrel, a first barrel component, a second barrel component, and a coupling pin. The stationary barrel surrounds an axis and has a first surface, a second surface opposite to the first surface in radial directions relative to the axis, and a guide slot formed through the first and second surfaces and extending parallel to the axis. The first barrel component engages sleevingly the stationary barrel, and has a third surface that faces the first surface of the stationary barrel. The second barrel component engages sleevingly the stationary barrel, and has a fourth surface that faces the second surface of the stationary barrel, and a cam slot that is formed in the fourth surface, that extends around the axis, and that is cooperatively defined by a first slide surface connected to the fourth surface, a second slide surface connected to the fourth surface and confronting the first slide surface, a first abutting portion connected to the first slide surface opposite to the fourth surface, and a second abutting portion connected to the second slide surface opposite to the fourth surface. The coupling pin extends radially from the first barrel component through the stationary barrel to the second barrel component, and has a connecting section connected to the third surface of the first barrel component, a guide section extending from the connecting section and through the guide slot in the stationary barrel so as to be guided thereby, a retaining section extending from the guide section and slidable along the first and second slide surfaces of the cam slot in the second barrel component, and a reinforcing section extending from the retaining section and extending between the first and second abutting portions of the cam slot.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
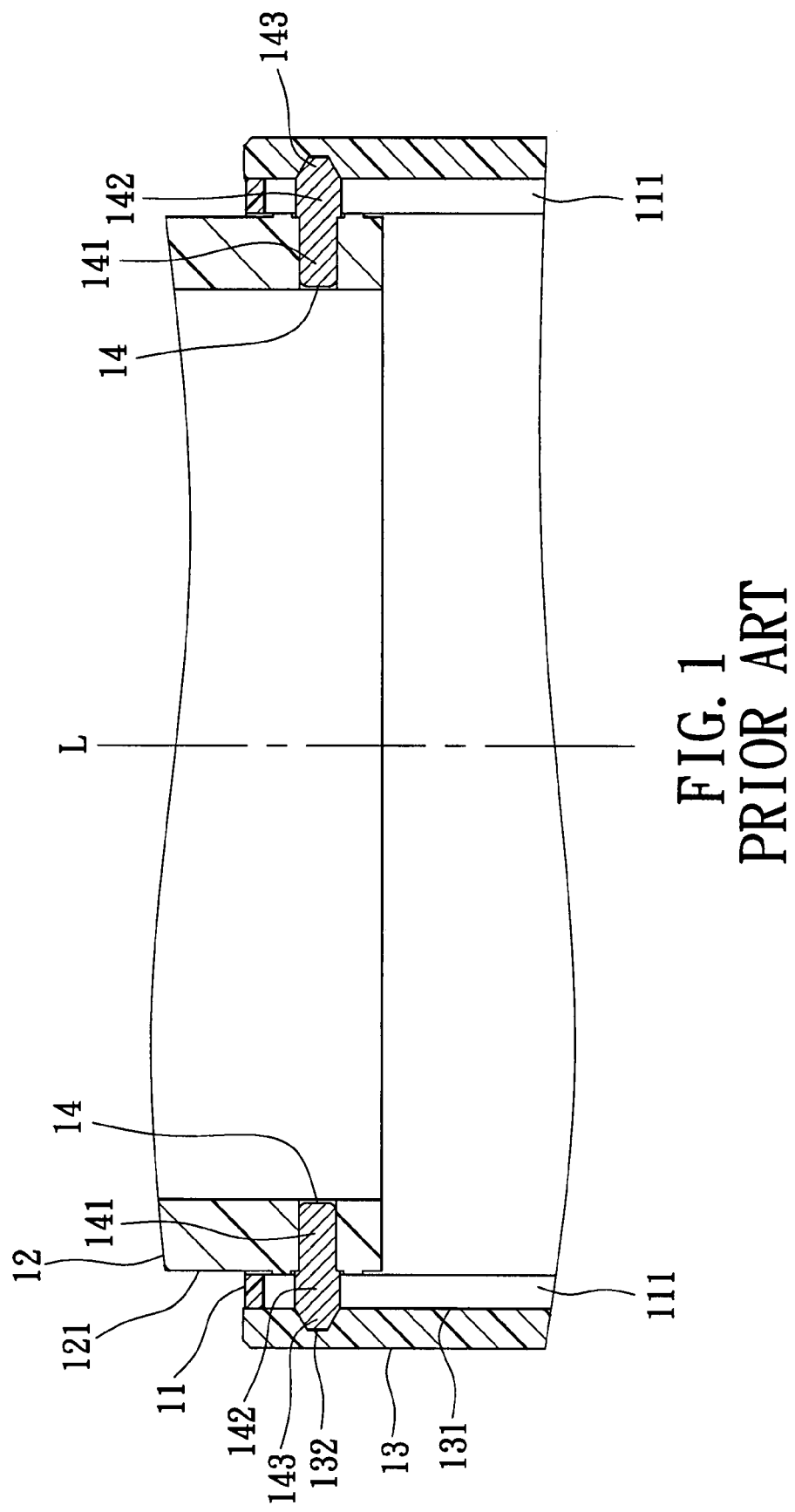
FIG. 1 is a fragmentary sectional side view of a conventional lens device, illustrating a pair of coupling pins, each of which has a retaining section retained in a cam slot.
Figure 2:
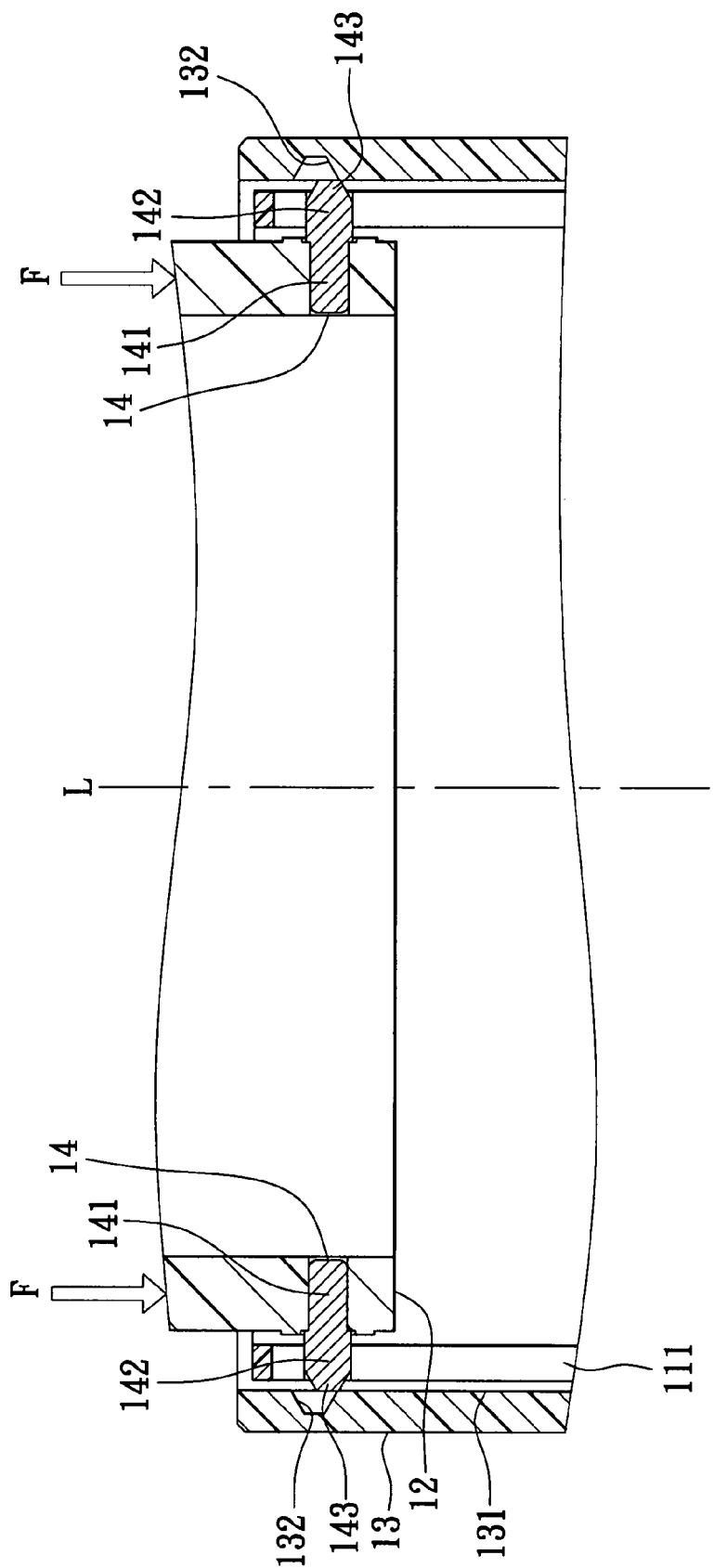
FIG. 2 is a view similar to FIG. 1, but illustrating the retaining section of each of the coupling pins sliding out of the respective cam slot after application of an impact force.
Figure 3:
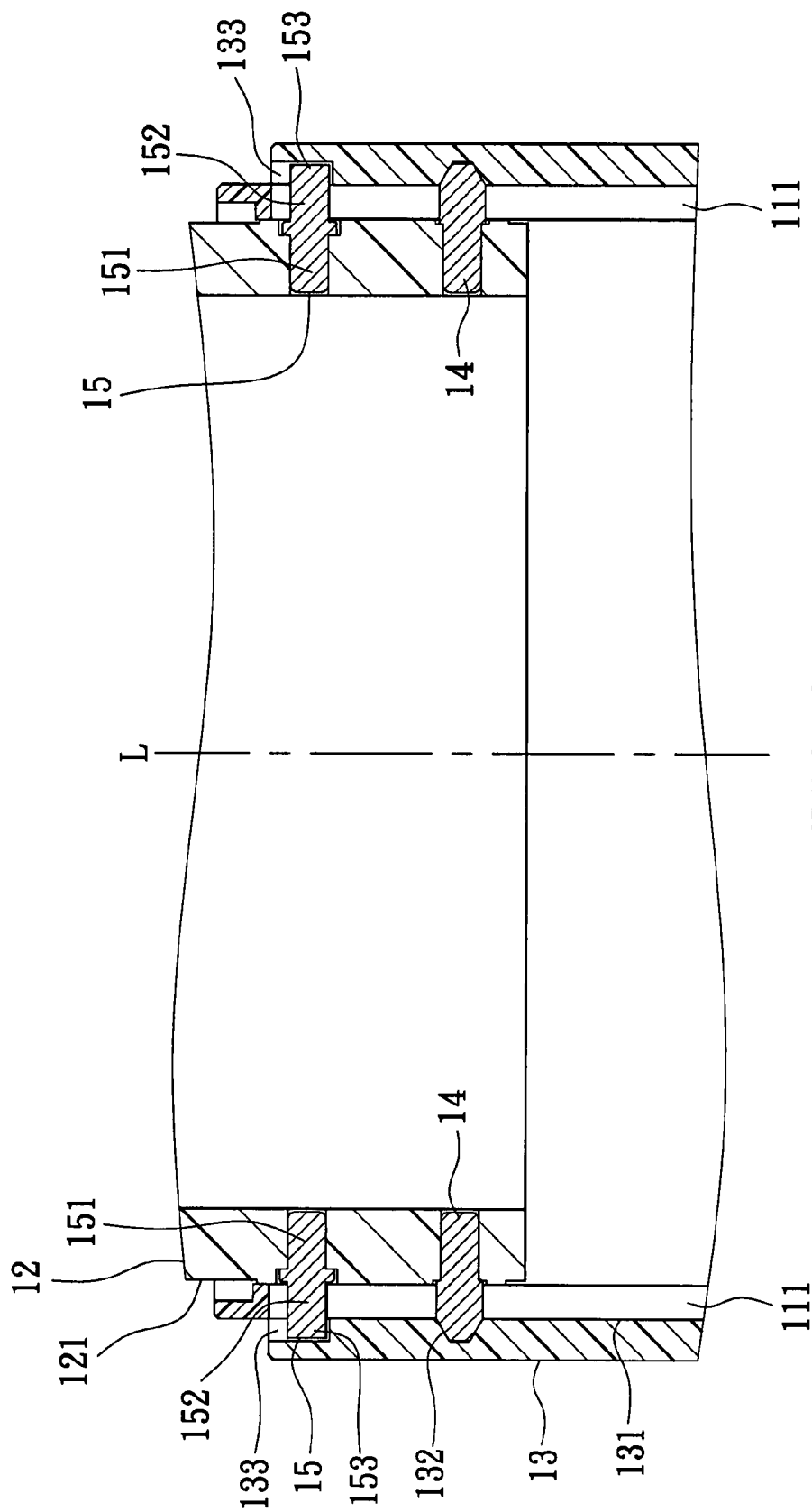
FIG. 3 is a fragmentary sectional side view of another conventional lens device.
Figure 4:
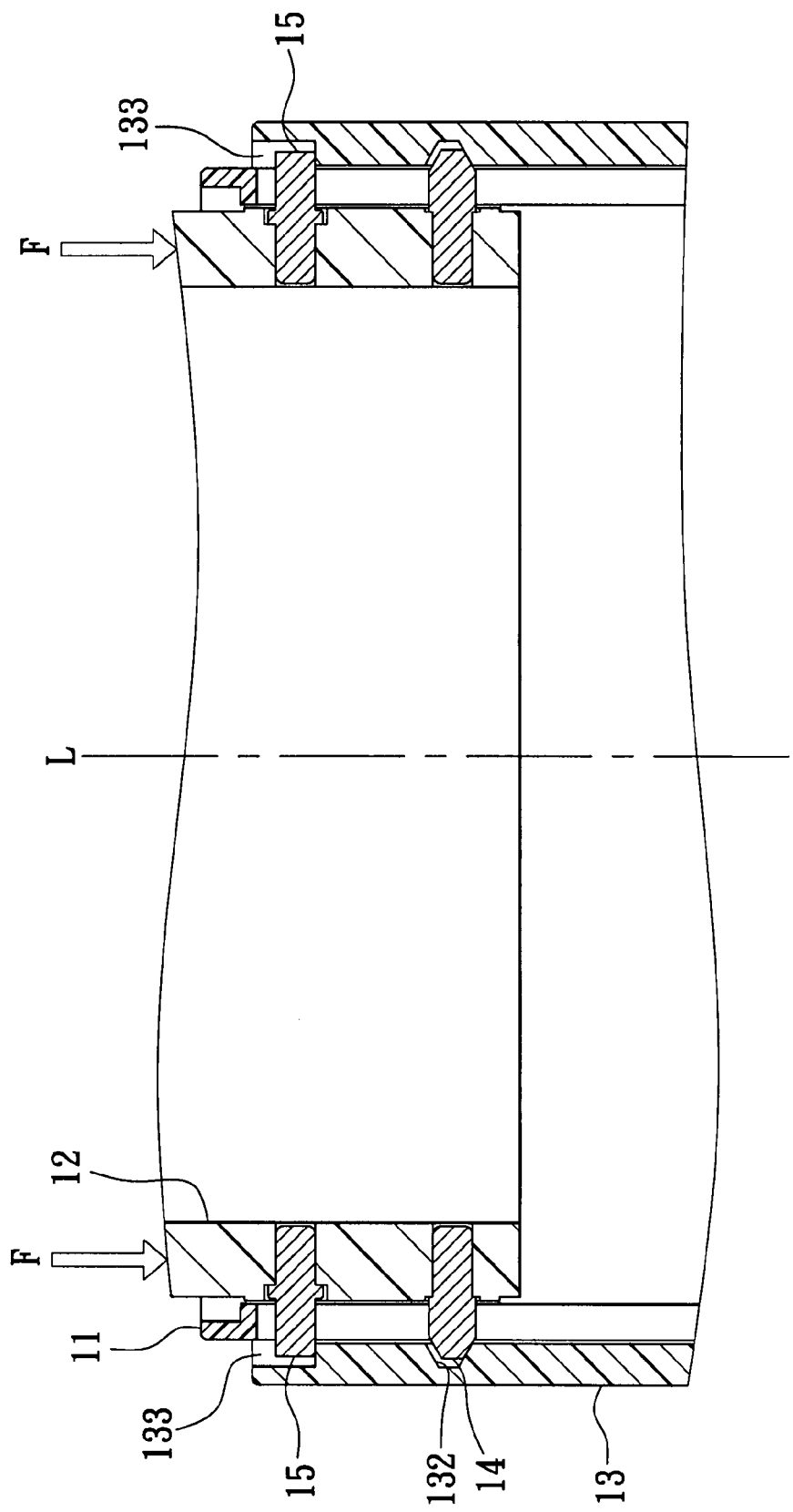
FIG. 4 is a view similar to FIG. 3, but illustrating the lens device after application of an impact force.

Before the present invention is described in greater detail, it should be noted that like elements are denoted by the same reference numerals throughout the disclosure.

Figure 5:
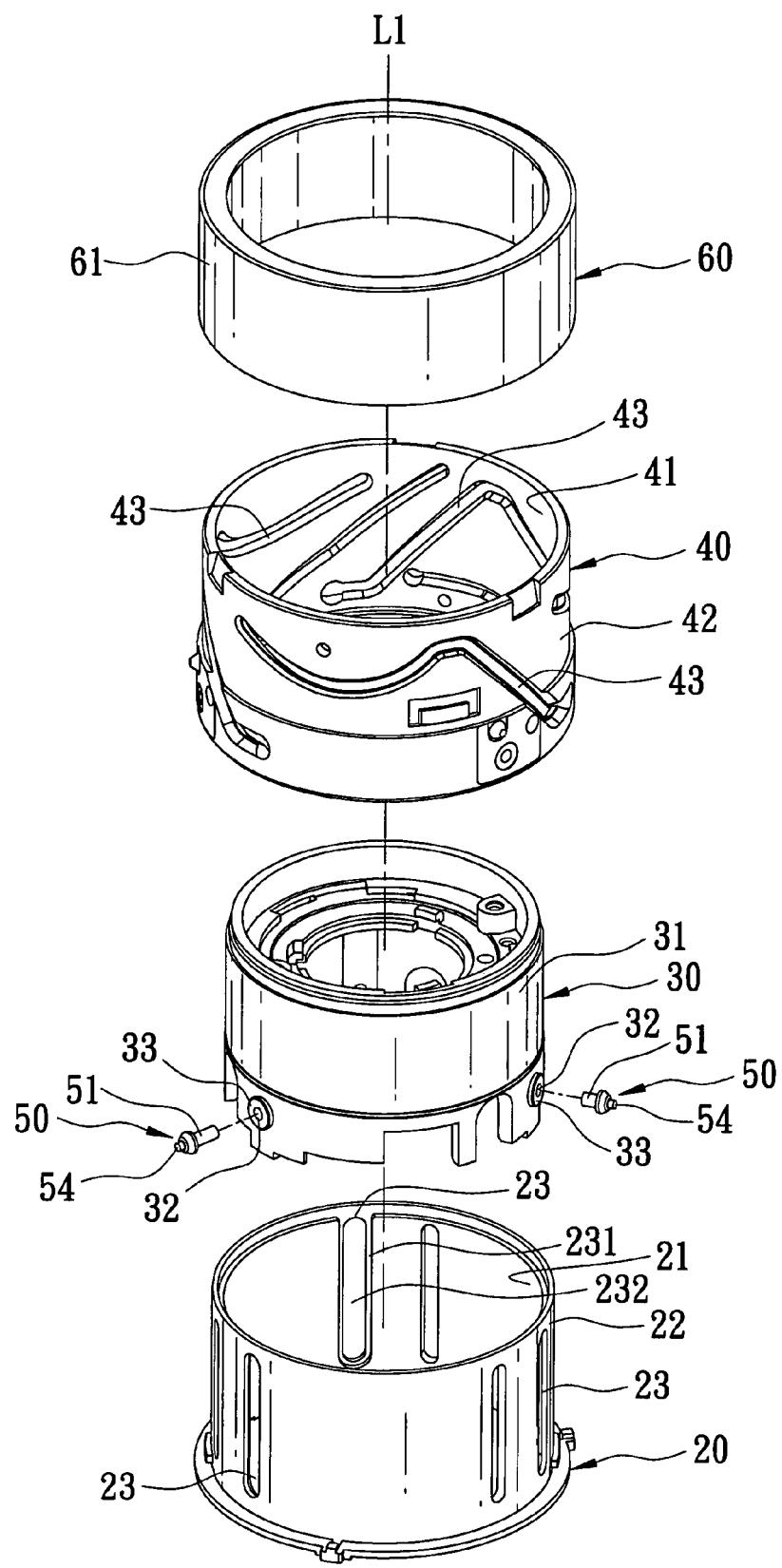
FIG. 5 is an exploded perspective view of a preferred embodiment of a barrel assembly according to the invention.
Figure 6:
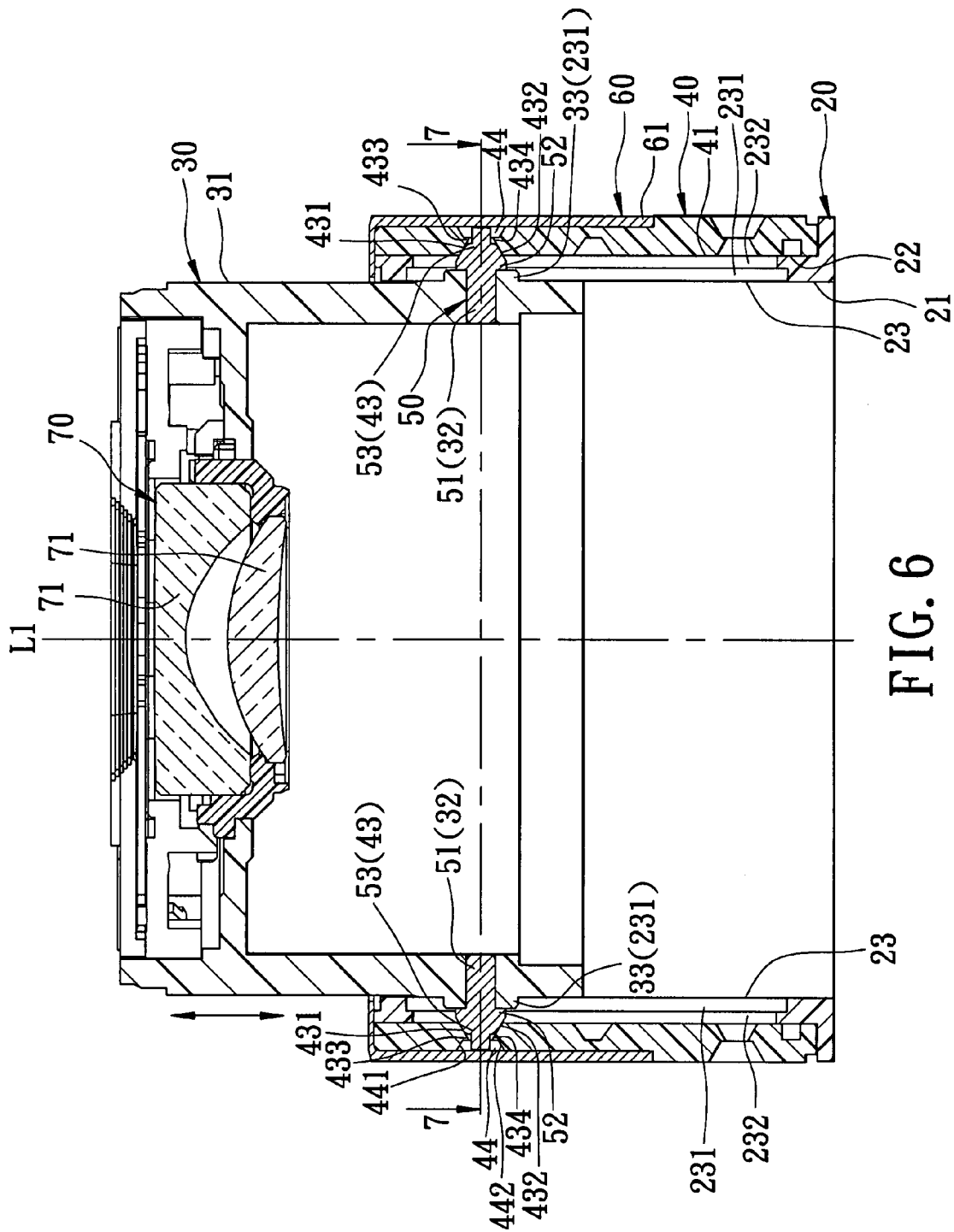
FIG. 6 is an assembled sectional side view of the preferred embodiment.
Figure 7:
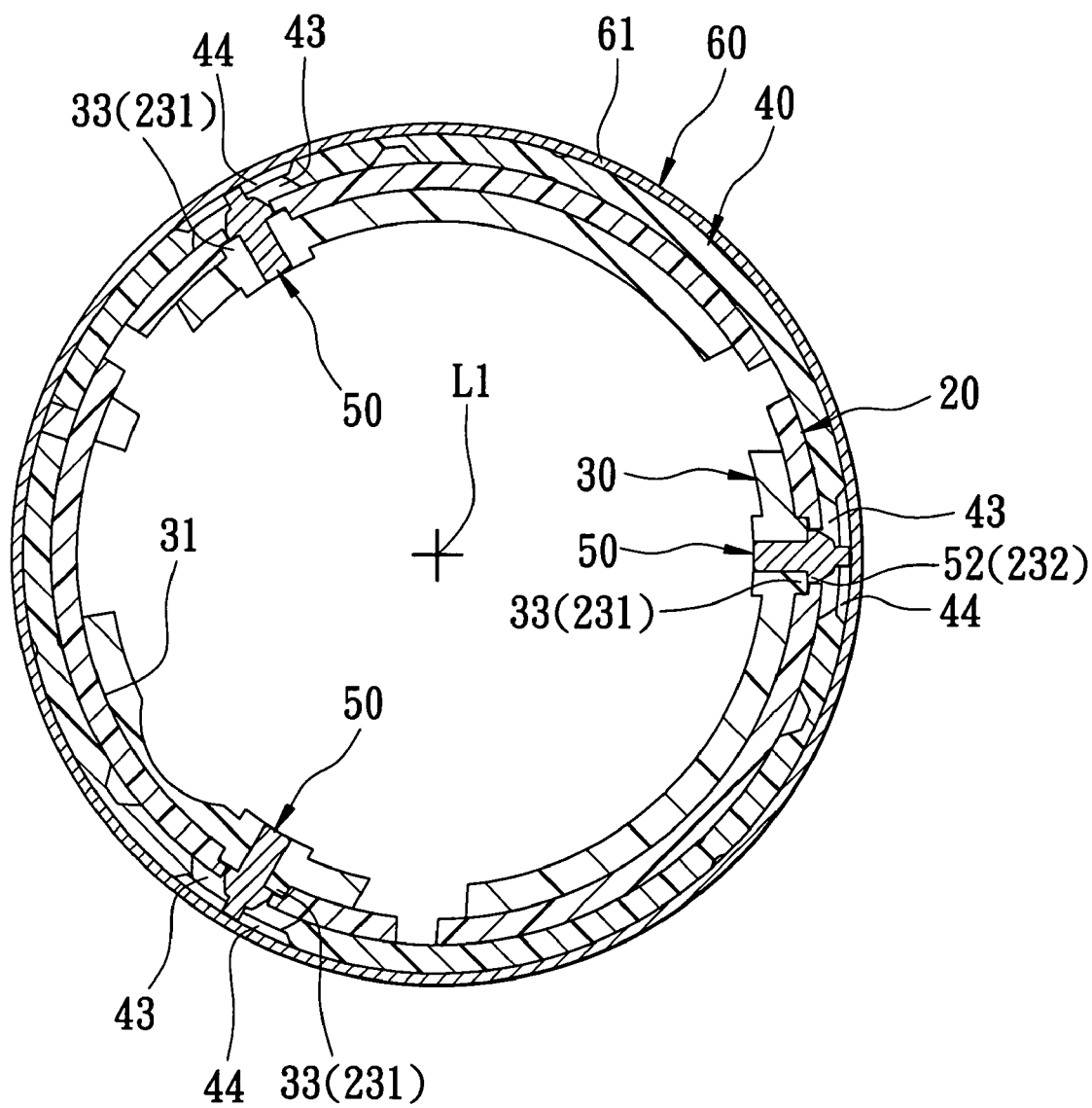
FIG. 7 is a sectional view of the preferred embodiment taken along line 7-7 in FIG. 6.

As shown in FIGS. 5 to 7, the preferred embodiment of a barrel assembly according to the present invention comprises a stationary barrel 20, a first barrel component 30, a second barrel component 40, three coupling pins 50, and an outer barrel 60. This preferred embodiment is adapted for use in a camera lens device with the stationary barrel 20 as a main barrel, with the first barrel component 30 as an inner lens barrel sleeved inside the main barrel, and with the second barrel component 40 as an outer lens barrel sleeved outside main barrel. The lens device includes a lens unit 70 disposed in the first barrel component 30 of the barrel assembly.

The stationary barrel 20 surrounds an axis (L1) and has a first surface 21, a second surface 22 opposite to the first surface 21 in radial directions relative to the axis (L1), and three guide slots 23. In this embodiment, the first and second surfaces 21, 22 are inner and outer surfaces of the stationary barrel 20, respectively. Each of the guide slots 23 is formed through the first and the second surfaces 21, 22, extends parallel to the axis (L1), and has a recess portion 231 formed in the first surface 21 thereof, and a through portion 232 formed in the second surface 22 thereof such that the guide slot 23 has a stepped configuration.

The first barrel component 30 has a third surface 31 facing the first surface 21 of the stationary barrel 20, three pin holes 32 (only two are shown in FIG. 5), and three protrusions 33 each protruding from the third surface 31 and slidably retained in the recess portion 231 of a respective one of the guide slots 23 in the stationary barrel 20. In this embodiment, the third surface 31 is an outer surrounding surface that faces the inner surface of the stationary barrel 20.

Figure 8:
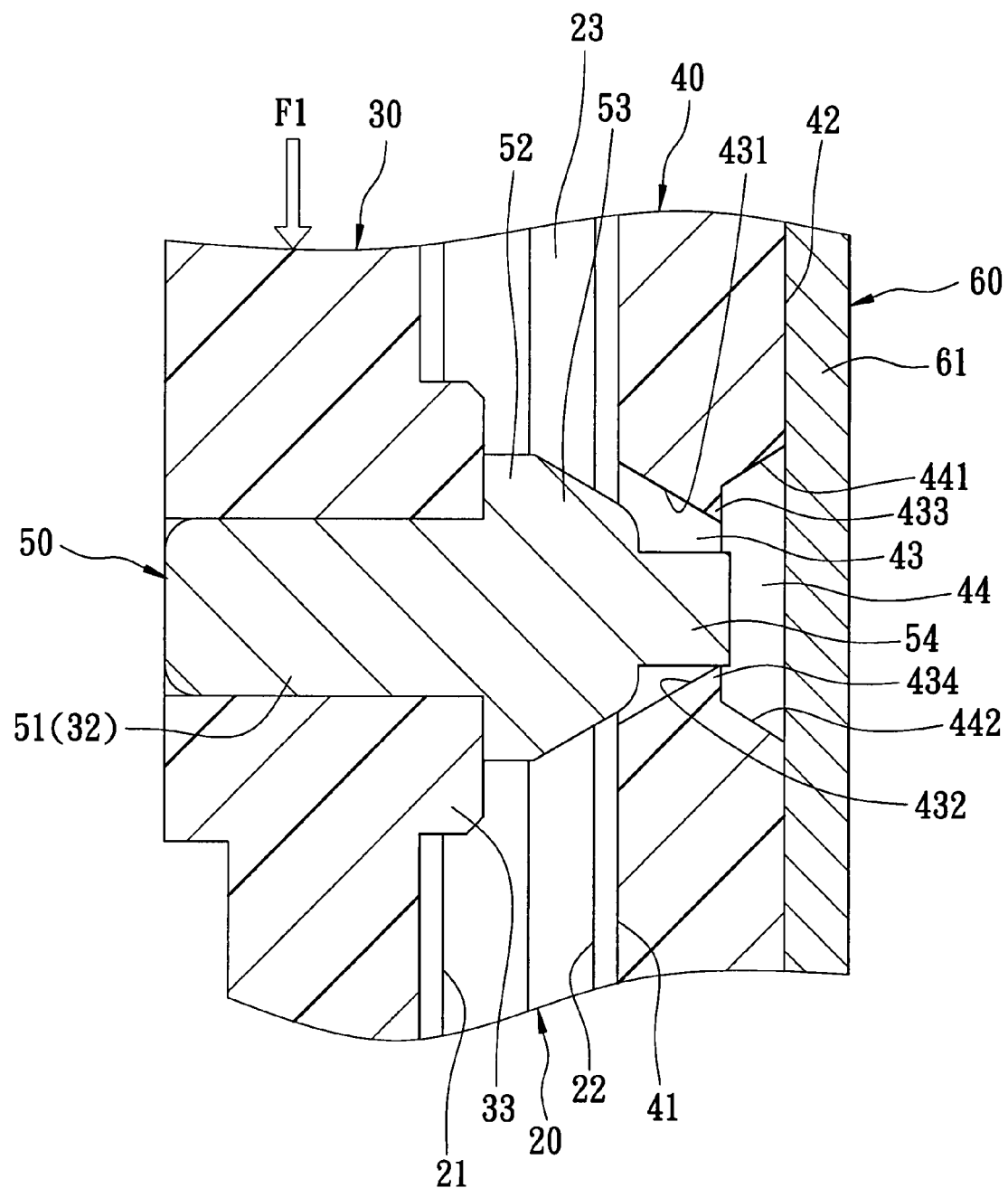
FIG. 8 is a fragmentary sectional view of the preferred embodiment, illustrating a reinforcing section of a coupling pin abutting against a second abutting portion after application of an impact force.

As shown in FIGS. 6 to 8, the second barrel component 40 has a fourth surface 41 that faces the second surface 22 of the stationary barrel 20, and three cam slots 43. Each of the cam slots 43 is formed in the fourth surface 41, extends around the axis (L1), and is cooperatively defined by a first slide surface 431 connected to the fourth surface 41, a second slide surface 432 connected to the fourth surface 41 and confronting the first surface 431, a first abutting portion 433 connected to the first slide surface 431 opposite to the fourth surface 41, and a second abutting portion 434 connected to the second slide surface 432 opposite to the fourth surface 41. The first and second slide surfaces 431, 432 are inclined surfaces such that a distance between them is reduced in a direction away from the fourth surface 41. The second barrel component 40 further has a fifth surface 42 opposite to the fourth surface 41 in radial directions relative to the axis (L1), and three outer slots 44. In this embodiment, the fourth and fifth surfaces 41, 42 are inner and outer annular surfaces of the second barrel component 40, respectively. Each of the outer slots 44 is formed in the fifth surface 42, is in spatial communication with a respective one of the cam slots 43, and is cooperatively defined by a first slot surface 441 extending between the fifth surface 42 and the first abutting portion 433, and a second slot surface 442 extending between the fifth surface 42 and the second abutting portion 434. The first and second slot surfaces 441, 442 are inclined surfaces such that a distance between them is reduced in a direction away from the fifth surface 42.

Each of the coupling pins 50 extends radially from the first barrel component 30 through the stationary barrel 20 to the second barrel component 40, and has a connecting section 51 connected to the third surface 31 of the first barrel component 30 and extending through a respective one of the pin holes 32, a guide section 52 extending from the connecting section 51 and through a respective one of the guide slots 23 in the stationary barrel 20 so as to be guided thereby, a frustoconical retaining section 53 extending from the guide section 52 and slidable along the first and second slide surfaces 431, 432 of a respective one of the cam slots 43 in the second barrel component 40, and a reinforcing section 54 extending from the retaining section 53, and extending between the first and second abutting portions 433, 434 of a respective one of the cam slots 43 into the respective one of the outer slots 44 between the first and second slot surfaces 441, 442.

The outer barrel 60 is sleeved on the fifth surface 42 of the second barrel component 40, and includes a surrounding wall 61 to cover the outer slots 44 in the second barrel component 40 and to protect the second barrel component 40.

The lens unit 70 of the lens device includes a plurality of lenses 71 disposed in the first barrel component 30 along the axis (L1).

Since the guide section 52 of each of the coupling pins 50 is retained within the respective one of the guide slots 23 in the stationary barrel 20, when the second barrel component 40 rotates relative to the stationary barrel 20, each of the coupling pins 50 will slide respectively along the cam slots 43 and be guided to move along the through portion 232 of the respective one of the guide slots 23. In addition, since each of the protrusions 33 of the first barrel component 30 is slidably retained in the recess portion 231 of the respective guide slot 23 in the stationary barrel 20, the first barrel component 30 will move together with the coupling pins 50. When the first barrel component 30 moves relative to the stationary barrel 20, the lens unit 70 disposed in the first barrel component 30 will move together with the first barrel component 30, and a distance between the lens unit 70 of the lens device and an image sensor (not shown) will change, thereby resulting in zoom adjustment.

As shown in FIG. 8, when the first barrel component 30 is applied with an impact force (F1), the retaining section 53 of a respective one of the coupling pins 50 will be forced to slide outwardly of the respective one of the cam slots 43, and the reinforcing section 54 of a respective one of the coupling pins 50 will also move together with the retaining section 53 in a direction from the corresponding one of the outer slots 44 toward the corresponding one of the cam slots 43. However, the reinforcing section 54 will abut against the second abutting portion 434 of a respective one of the cam slots 43, and will be unable to move out of the cam slot 43 to prevent the first barrel component 30 and the coupling pins 50 from being stuck in the second barrel component 40. As shown in FIG. 6, when the impact force (F1) disappears, the retaining section 53 will slide back into the cam slot 43, and the reinforcing section 54 will move back into the outer slot 44. If the impact force (F1) is not applied to the first barrel component 30 in a direction parallel to the axis (L1), the protrusions 33 of the first barrel component 30 will absorb the horizontal force component (not shown) of the impact force (F1), thereby distributing the impact force (F1) and reinforcing the strength of the coupling pins 50.

Moreover, compared to the reinforcing pins 15 of the aforementioned second conventional lens device, the reinforcing section 54 of each of the coupling pins 50 of the preferred embodiment is easier to fabricate, i.e., the manufacturing cost can be effectively reduced. Furthermore, the lengths of the first and second barrel components 30, 40 can be reduced, thereby resulting in a thinner lens device.

Figure 9:
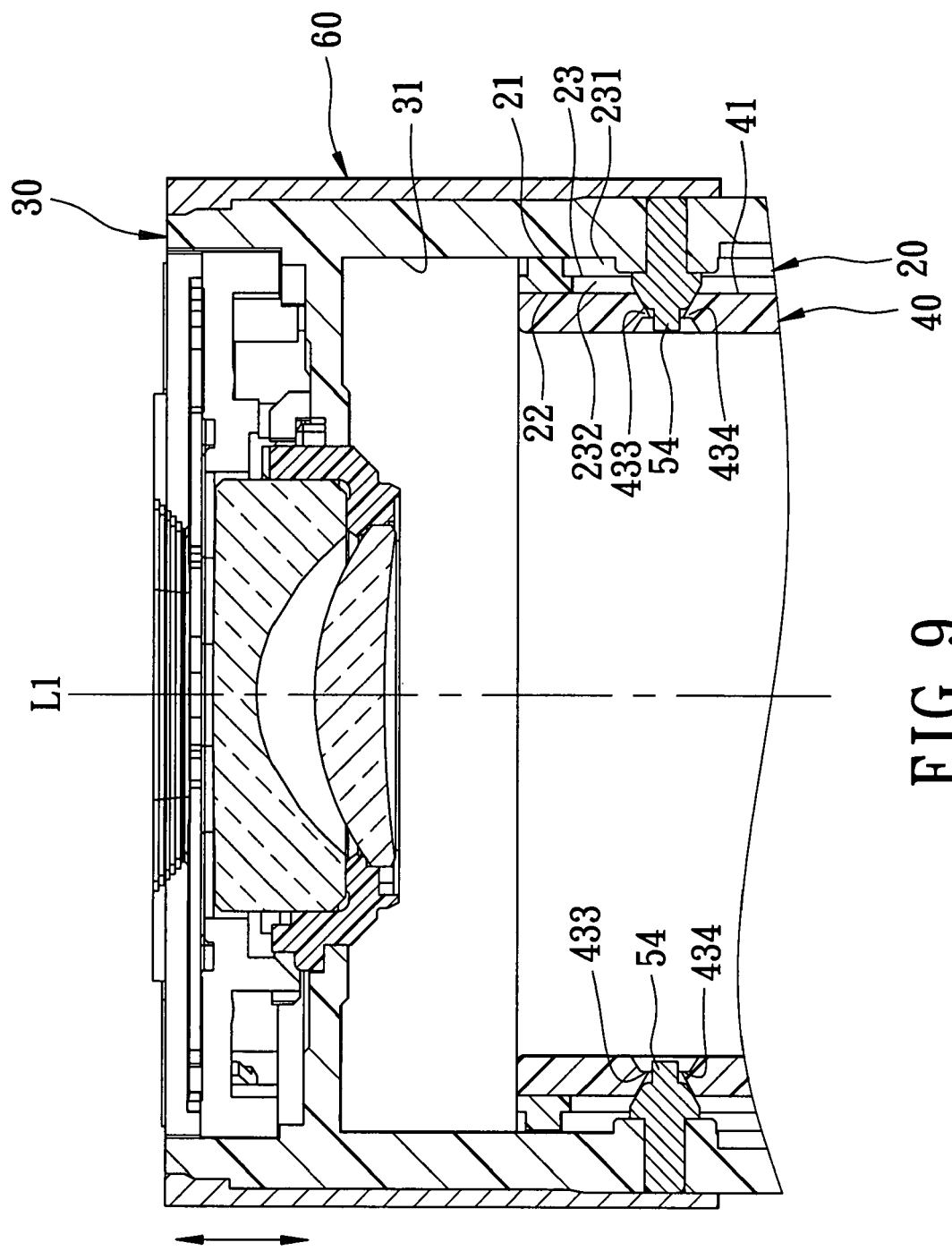
FIG. 9 is a fragmentary sectional side view of a lens device incorporating another preferred embodiment of the barrel assembly according to the invention.

As shown in FIG. 9, the second preferred embodiment of the barrel assembly according to the present invention has a structure similar to that of the first preferred embodiment. The main difference between this embodiment and the previous preferred embodiment resides in the positions of the first and second barrel components 30, 40, i.e., the first barrel component 30 is sleeved outside the stationary barrel 20 to serve as an outer lens barrel, and the second barrel component 40 is sleeved inside the stationary barrel 20 to serve as an inner lens barrel. When the second barrel component 40 rotates relative to the stationary barrel 20, the first barrel component 30 will move along the axis (L1) relative to the stationary barrel 20. When the first barrel component 30 is applied with an impact force, the reinforcing section 54 of each of the coupling pins 50 will abut against the second abutting portion 434 of the respective one of the cam slots 43 in the second barrel component 40. The second preferred embodiment has the same advantages as those of the first preferred embodiment.

It should be noted that, while this invention is exemplified using three guide slots 23, three pin holes 32, three protrusions 33, three cam slots 43, three outer slots 44, and three coupling pins 50, only one guide slot 23, one pin hole 32, one protrusion 33, one cam slot 43, one outer slot 44, and one coupling pin 50 may be employed in other embodiments of this invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A barrel assembly comprising:
   a stationary barrel surrounding an axis and having a first surface, a second surface opposite to said first surface in radial directions relative to the axis, and a guide slot formed through said first and second surfaces and extending parallel to the axis;
   a first barrel component engaging sleevingly said stationary barrel, and having a third surface that faces said first surface of said stationary barrel;
   a second barrel component engaging sleevingly said stationary barrel, and having a fourth surface that faces said second surface of said stationary barrel, and a cam slot that is formed in said fourth surface, that extends around the axis, and that is cooperatively defined by a first slide surface connected to said fourth surface, a second slide surface connected to said fourth surface and confronting said first slide surface, a first abutting portion connected to said first slide surface opposite to said fourth surface, and a second abutting portion connected to said second slide surface opposite to said fourth surface; and
   a coupling pin extending radially from said first barrel component through said stationary barrel to said second barrel component, and having a connecting section connected to said third surface of said first barrel component, a guide section extending from said connecting section and through said guide slot in said stationary barrel so as to be guided thereby, a retaining section extending from said guide section and slidable along said first and second slide surfaces of said cam slot in said second barrel component, and a reinforcing section extending from said retaining section and extending between said first and second abutting portions of said cam slot.

2. The barrel assembly as claimed in claim 1, wherein:
   said retaining section of said coupling pin is frustoconical, and
   said first and second slide surfaces of said cam slot in said second barrel component are inclined surfaces such that a distance between said first and second slide surfaces is reduced in a direction away from said fourth surface.

3. The barrel assembly as claimed in claim 2, wherein said second barrel component further has a fifth surface opposite to said fourth surface in radial directions relative to the axis, and an outer slot formed in said fifth surface and in spatial communication with said cam slot, said outer slot being cooperatively defined by a first slot surface that extends between said fifth surface and said first abutting portion, and a second slot surface that extends between said fifth surface and said second abutting portion.

4. The barrel assembly as claimed in claim 3, wherein:
   said first and second slot surfaces of said outer slot in said second barrel component are inclined surfaces such that a distance between said first and second slot surfaces is reduced in a direction away from said fifth surface, and
   said reinforcing section of said coupling pin further extends into said outer slot between said first and second slot surfaces.

5. The barrel assembly as claimed in claim 3, wherein said first barrel component is sleeved inside said stationary barrel, and said second barrel component is sleeved outside said stationary barrel.

6. The barrel assembly as claimed in claim 5, further comprising an outer barrel that is sleeved on said fifth surface of said second barrel component and that includes a surrounding wall to cover said outer slot in said second barrel component.

7. The barrel assembly as claimed in claim 1, wherein:
   said stationary barrel has three of said guide slots;
   said second barrel component has three of said cam slots; and
   said barrel assembly comprises three of said coupling pins.

8. The barrel assembly as claimed in claim 1, wherein:
   said guide slot in said stationary barrel has a recess portion formed in said first surface thereof, and a through portion formed in said second surface thereof such that said guide slot has a stepped configuration; and
   said first barrel component further has a pin hole through which said connecting section of said coupling pin extends, and a protrusion protruding from said third surface of said first barrel component and slidably retained in said recess portion.

9. A lens device comprising:
   a main barrel surrounding an axis and having an inner surface, an outer surface opposite to said inner surface in radial directions relative to the axis, and a guide slot formed through said inner and outer surfaces and extending parallel to the axis;
   an inner lens barrel sleeved inside said main barrel, and having an outer surrounding surface that faces said inner surface of said main barrel;
   an outer lens barrel sleeved outside said main barrel, and having an inner annular surface that faces said outer surface of said main barrel, and a cam slot that is formed in said inner annular surface, that extends around the axis, and that is cooperatively defined by a first slide surface connected to said inner annular surface, a second slide surface connected to said inner annular surface and confronting said first slide surface, a first abutting portion connected to said first slide surface opposite to said inner annular surface, and a second abutting portion connected to said second slide surface opposite to said inner annular surface;

a coupling pin extending radially from said inner lens barrel through said main barrel to said outer lens barrel, and having a connecting section connected to said outer surrounding surface of said inner lens barrel, a guide section extending from said connecting section and through said guide slot in said main barrel so as to be guided thereby, a retaining section extending from said guide section and slidable along said first and second slide surfaces of said cam slot in said outer lens barrel, and a reinforcing section extending from said retaining section and extending between said first and second abutting portions of said cam slot; and a lens unit including a lens that is disposed in said inner lens barrel.

10. The lens device as claimed in claim 9, wherein:
said retaining section of said coupling pin is frustoconical, and
said first and second slide surfaces of said cam slot in said outer lens barrel are inclined surfaces such that a distance between said first and second slide surfaces is reduced in a direction away from said inner annular surface.

11. The lens device as claimed in claim 10, wherein said outer lens barrel further has an outer annular surface opposite to said inner annular surface in radial directions relative to the axis, and an outer slot formed in said outer annular surface and in spatial communication with said cam slot, said outer slot being cooperatively defined by a first slot surface that extends between said outer annular surface and said first abutting portion, and a second slot surface that extends between said outer annular surface and said second abutting portion.

12. The lens device as claimed in claim 11, wherein:
said first and second slot surfaces of said outer slot in said outer lens barrel are inclined surfaces such that a distance between said first and second slot surfaces is reduced in a direction away from said outer annular surface, and
said reinforcing section of said coupling pin further extends into said outer slot between said first and second slot surfaces.

13. The lens device as claimed in claim 11, further comprising an outer barrel that is sleeved on said outer annular surface of said outer lens barrel and that includes a surrounding wall to cover said outer slot in said outer lens barrel.

14. The lens device as claimed in claim 9, wherein:
said main barrel has three of said guide slots;
said outer lens barrel has three of said cam slots; and
said lens device comprises three of said coupling guide pins.

15. The lens device as claimed in claim 9, wherein:
said guide slot in said main barrel has a recess portion formed in said inner surface thereof, and a through portion formed in said outer surface thereof such that said guide slot has a stepped configuration; and
said inner lens barrel further has a pin hole through which said connecting section of said coupling pin extends, and a protrusion protruding from said outer surrounding surface of said inner lens barrel and slidably retained in said recess portion.

* * * * *